(12) United States Patent
Vu et al.

(10) Patent No.: US 11,293,549 B2
(45) Date of Patent: Apr. 5, 2022

(54) RELEASABLE SEAL ASSEMBLY FOR EMERGENCY ACCESS AND EGRESS

(71) Applicant: Westinghouse Air Brake Technologies Corporation, Wilmerding, PA (US)

(72) Inventors: Christopher Vu, Laval (CA); Fabien Vautier, Veretz (FR); Olivier Salles, Lecousse (FR)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 16/938,058

(22) Filed: Jul. 24, 2020

(65) Prior Publication Data

US 2020/0355269 A1 Nov. 12, 2020

Related U.S. Application Data

(63) Continuation-in-part of application No. 16/235,285, filed on Dec. 28, 2018, now abandoned.

(51) Int. Cl.
*F16J 15/02* (2006.01)
*B61D 19/02* (2006.01)

(52) U.S. Cl.
CPC .......... *F16J 15/025* (2013.01); *B61D 19/023* (2013.01)

(58) Field of Classification Search
CPC ............... E06B 1/64; E06B 2003/6226; E06B 2003/6252; F16J 15/025; B60J 10/20; B60J 10/23; B60J 10/26; B60J 10/27; B60J 10/32; B60J 10/36; B60J 10/365; B60J 10/70; B61D 19/023
See application file for complete search history.

(56) References Cited

U.S. PATENT DOCUMENTS

| | | | | |
|---|---|---|---|---|
| 2,189,138 A | * | 2/1940 | Eichner | E06B 3/6205 |
| | | | | 52/208 |
| 2,556,775 A | * | 6/1951 | Oswald | B60J 10/70 |
| | | | | 52/208 |
| 2,609,070 A | * | 9/1952 | Frehse | B60J 10/365 |
| | | | | 52/204.597 |

(Continued)

FOREIGN PATENT DOCUMENTS

| | | | | |
|---|---|---|---|---|
| DE | 2608719 A1 | * | 9/1977 | B60J 10/70 |
| DE | 202012010934 U1 | * | 12/2012 | B60J 10/365 |

(Continued)

*Primary Examiner* — Jessie T Fonseca
(74) *Attorney, Agent, or Firm* — The Small Patent Law Group LLC; Josef L. Hoffmann (57) ABSTRACT

A releasable seal assembly is provided that may include a first extension profile and a second extension profile extending from a core. The first extension profile may include a first exit panel side wing resiliently hinged to the core, and a first host panel side wing extending from the core. The first exit panel side wing and the first host panel side wing may define a first key cavity, and the first exit panel side wing has a first arcuate surface that may define a first retention tongue recess of the first key cavity. Additionally, the first host panel side wing has a second arcuate surface that defines a second retention tongue recess of the first key cavity. The first exit panel side wing may include a first exit panel side wing tongue configured to be received within the second retention tongue recess.

17 Claims, 7 Drawing Sheets

(56) References Cited

U.S. PATENT DOCUMENTS

| | | | | |
|---|---|---|---|---|
| 2,609,071 A * | 9/1952 | Morgann | E06B 3/6205 | 52/204.597 |
| 2,612,972 A * | 10/1952 | Heimgartner | B60J 10/265 | 52/204.597 |
| 2,623,250 A * | 12/1952 | Chilton | B60J 10/365 | 52/208 |
| 2,625,716 A * | 1/1953 | Beck | B60J 10/365 | 52/208 |
| 2,637,880 A * | 5/1953 | Beck | E06B 3/6205 | 52/208 |
| 2,654,919 A * | 10/1953 | Marvin | B60J 10/365 | 52/208 |
| 2,655,239 A * | 10/1953 | Alexande | F16B 5/121 | 52/204.597 |
| 2,679,075 A * | 5/1954 | Bradley | B60J 10/70 | 52/208 |
| 2,683,905 A * | 7/1954 | Beck | B60J 10/70 | 52/208 |
| 2,698,072 A * | 12/1954 | Beck | B60J 10/365 | 52/204.597 |
| 2,748,431 A * | 6/1956 | Sven | B60J 10/365 | 52/208 |
| 2,763,345 A * | 9/1956 | Beck | B60J 10/70 | 52/204.597 |
| 2,763,346 A * | 9/1956 | Paule | B60J 10/70 | 52/204.597 |
| 2,815,105 A * | 12/1957 | Albert | B60J 10/365 | 52/204.597 |
| 2,820,992 A * | 1/1958 | Clayton-Wright | B60J 10/70 | 52/204.51 |
| 2,984,875 A * | 5/1961 | Herr | B60J 10/365 | 49/490.1 |
| 3,002,783 A * | 10/1961 | Hofmeister | B60J 10/235 | 49/490.1 |
| 3,068,617 A * | 12/1962 | Borski | E06B 3/6205 | 52/208 |
| 3,092,877 A * | 6/1963 | Perilstein | E06B 3/6205 | 52/204.595 |
| 3,189,143 A * | 6/1965 | Adams | B60J 10/365 | 52/208 |
| 3,230,677 A * | 1/1966 | Brown | E06B 3/6205 | 52/208 |
| 3,279,124 A * | 10/1966 | Brown | E06B 3/6205 | 49/479.1 |
| 3,381,435 A * | 5/1968 | Smith | E06B 3/6205 | 52/204.597 |
| 3,416,279 A * | 12/1968 | Dallen | E06B 3/6205 | 52/204.597 |
| 3,550,242 A * | 12/1970 | Dallen | E04F 21/28 | 29/235 |
| 3,571,994 A * | 3/1971 | Brown | E06B 3/6205 | 52/209 |
| 3,604,171 A * | 9/1971 | Perilstein | E06B 3/6205 | 52/204.597 |
| 3,680,276 A * | 8/1972 | Wright et al. | E06B 3/6205 | 52/204.593 |
| 3,722,730 A * | 3/1973 | Joos | F16J 15/025 | 220/378 |
| 3,766,697 A * | 10/1973 | Jackson | F16J 15/025 | 52/312 |
| 3,783,568 A * | 1/1974 | Adler | B60J 10/30 | 52/204.597 |
| 3,866,374 A * | 2/1975 | Dallen | E04B 2/967 | 52/204.597 |
| 3,959,941 A * | 6/1976 | Smith | E06B 1/64 | 52/204.597 |
| 4,089,143 A * | 5/1978 | La Pietra | E06B 3/28 | 52/172 |
| 4,343,121 A * | 8/1982 | Kruschwitz | B60J 10/365 | 428/122 |
| 4,347,693 A * | 9/1982 | Kruschwitz | B60J 10/235 | 52/204.597 |
| 4,483,113 A * | 11/1984 | Kruschwitz | B60J 10/365 | 52/204.597 |
| 4,813,195 A * | 3/1989 | Michlovic | E06B 3/6205 | 52/204.597 |
| 4,835,927 A * | 6/1989 | Michlovic | E06B 3/6205 | 52/204.597 |
| 5,809,707 A * | 9/1998 | Bargados | B60J 1/10 | 296/146.15 |
| 6,405,500 B1 * | 6/2002 | Lucas, Jr. | E06B 7/16 | 52/204.597 |
| 6,658,802 B2 * | 12/2003 | Lucas, Jr. | E06B 7/16 | 52/204.597 |
| 9,296,286 B1 * | 3/2016 | Wagner | B60J 10/70 | |
| 2002/0038497 A1 * | 4/2002 | Switzeny | B60J 10/16 | 24/561 |
| 2003/0148003 A1 * | 8/2003 | Wright | B65D 81/3222 | 426/115 |

FOREIGN PATENT DOCUMENTS

| | | | | |
|---|---|---|---|---|
| EP | 2505491 A1 * | 10/2012 | | B64C 1/14 |
| FR | 2431644 A1 * | 2/1980 | | B60J 10/365 |
| FR | 2492878 A1 * | 4/1982 | | B60J 10/70 |
| FR | 2620762 A1 * | 3/1989 | | B60J 10/70 |
| FR | 2695429 A1 * | 3/1994 | | E06B 3/6205 |
| GB | 2114200 A * | 8/1983 | | B60J 10/32 |
| GB | 2125474 A * | 3/1984 | | B60J 10/265 |
| JP | 4874694 B2 * | 2/2012 | | B60J 10/78 |
| WO | WO-2012011912 A1 * | 1/2012 | | B60J 10/365 |

* cited by examiner

RELEASABLE SEAL ASSEMBLY FOR EMERGENCY ACCESS AND EGRESS

CROSS-REFERENCE TO RELATED APPLICATIONS

This application is a continuation-in-part of U.S. patent application Ser. No. 16/235,285, filed on 28 Dec. 2018, entitled Releasable Seal Assembly for Emergency Access and Egress. The entire disclosure of the application is incorporated herein by reference.

BACKGROUND

Technical Field

The subject matter described relates to a panel mounting arrangement such as a removeable glass panel in a passenger rail car vestibule door.

Discussion of Art

New United States regulation 49 CFR § 238.112 titled "Door Emergency Egress and Rescue Access System" requires the installation of a removeable panel in passenger rail car vestibule doors. The removal process must be executable with the application of a reasonable force by passengers and emergency first responders. The seal components must also be sufficiently strong to withstand multiple disassembly and reassembly for testing purposes. For some applications, the seal must be watertight.

Existing zip strip seals do not give any consideration to panel removal pull force. For currently existing applications, the zip strip seal assembly/disassembly duty cycle is not a design consideration. They are therefore not designed to hold and facilitate multiple installation and removal.

Figure 1:
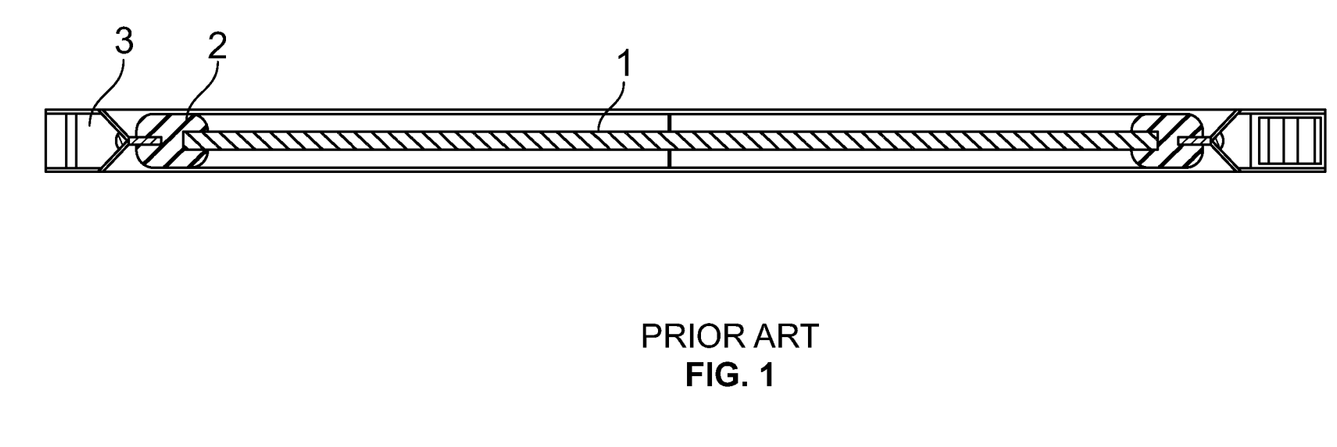
FIG. 1 illustrates a seal arrangement where the seal may be assembled and/or disassembled only a few times.

FIG. 1 illustrates a well-known rubber seal device wherein an exit panel 1, such as a windowpane of glass, is surrounded by a rubber seal 2 which fills the void between the exit panel and the window frame. The rubber seal 2 is installed around the window opening of a host panel 3 and then the exit panel 1 is secured to the rubber seal 2. A channel is provided in the rubber seal 2 to allow for the insertion of a locking strip which locks the rubber seal 2 in place.

BRIEF DESCRIPTION

In one or more embodiments, a releasable seal assembly is provided that may include a first extension profile and a second extension profile extending from a core. The first extension profile may include a first exit panel side wing resiliently hinged to the core and configured to move from a first biased position to a second biased position, and a first host panel side wing extending from the core. The first exit panel side wing and the first host panel side wing may define a first key cavity, and the first exit panel side wing has a first arcuate surface that may define a first retention tongue recess of the first key cavity. Additionally, the first host panel side wing has a second arcuate surface that defines a second retention tongue recess of the first key cavity. The first exit panel side wing may include a first exit panel side wing tongue configured to be received within the second retention tongue recess when the first exit panel side wing is in the second biased position.

In one or more embodiment, a releasable seal assembly is provided that may include a first extension profile and a second extension profile extending from a core. The first extension profile may include a first exit panel side wing resiliently hinged to the core, and at least partially define a first key cavity. The second extension profile may include a second exit panel side wing resiliently hinged to the core, and at least partially define a second key cavity. The releasable seal assembly may also include a first locking strip that may be asymmetrical and removably coupled within the first key cavity. The first locking strip may be configured to bias the first exit panel side wing against a panel disposed between the first exit panel side wing and the second exit panel side wing. The releasable seal assembly may also include a second locking strip that may similarly be asymmetrical and removably coupled within the second key cavity. The second locking strip may be configured to bias the second exit panel side wing against the panel disposed between the first exit panel side wing and the second exit panel side wing.

In one or more embodiments, a releasable seal assembly is provided that may include a first extension profile and a second extension profile extending from a core. The first extension profile may include a first exit panel side wing resiliently hinged to the core, and at least partially defining a first key cavity. The second extension profile may include a second exit panel side wing resiliently hinged to the core, and at least partially defining a second key cavity. The releasable seal assembly may also include a first locking strip that may be removably coupled within the first key cavity. The first locking strip may be configured to bias the first exit panel side wing against a panel disposed between the first extension profile and the second extension profile. The first locking strip may also have a first retention tongue with a first arcuate surface configured to matingly fit within a first retention tongue recess of the first extension profile. Additionally, the first locking strip may have a second retention tongue with a second arcuate surface that may be a different shape than the first arcuate surface. The first locking strip may also be configured to receive a second retention tongue recess of the second extension profile.

BRIEF DESCRIPTION OF THE DRAWINGS

The inventive subject matter may be understood from reading the following description of non-limiting embodiments, with reference to the attached drawings, wherein below.

DETAILED DESCRIPTION

One or more of the following features may be available in accordance with the inventive subject matter described herein: a) The capability of disassembly of a seal from both sides of a removeable panel or window. b) Ease of operability, which may permit rapid and easy removal from each side of a door during an emergency situation without requiring the use of a tool or other implement. In particular, the force required to remove the panel (or window) is substantially lower than for a traditional zip strip seal. c) For testability, the device can be repeatedly assembled/disassembled without damage and loss of function. d) Once in place with the locking strip, the seal arrangement provides significant panel retention so that a relatively high force applied on the exit panel through, for example, a foot kick, does not cause the panel to pop out of the host door panel. e) The arrangement provides a reduced or minimum cross-section thickness once in place to accommodate pocket door applications where seal protrusion over the outer main surface of the door panel should be minimized or reduced.

The device may provide an optional watertight seal for applications involving one side of the assembly exposed to the environment.

Figure 2:
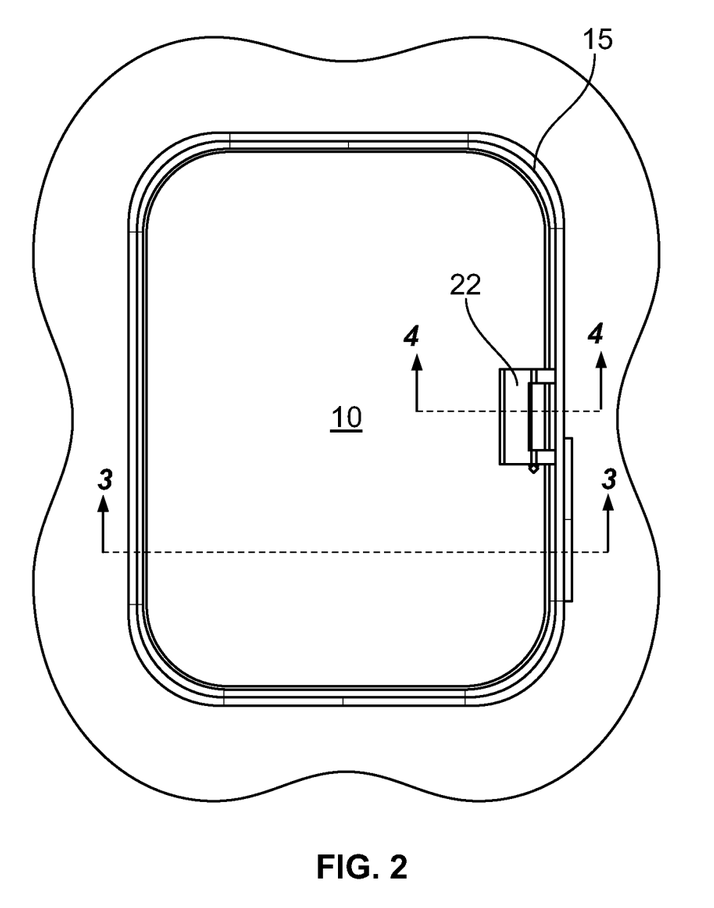
FIG. 2 is a representative door or side of a vehicle having an exit panel mounted to a host panel using a seal assembly.
Figure 3:
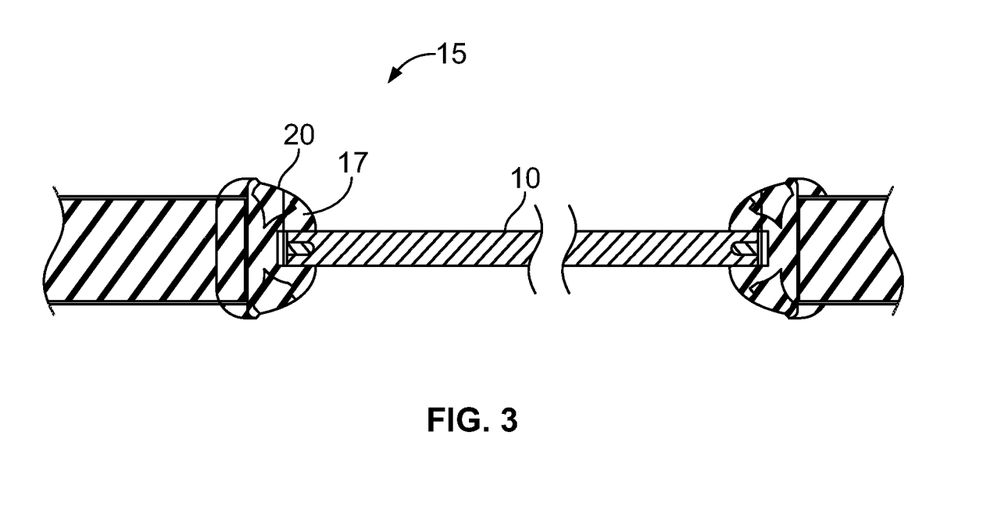
FIG. 3 is a view along arrows "3-3" in FIG. 2.
Figure 4:
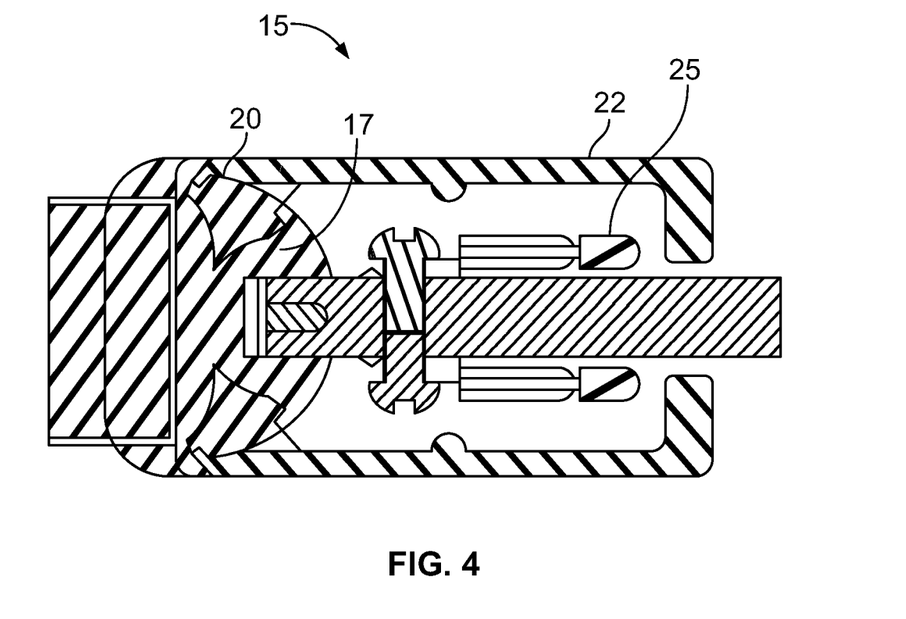
FIG. 4 is a view along arrows "4-4" in FIG. 2.

Directing attention to FIGS. 2-4, an exit panel 10 is surrounded by a seal assembly 15 made up of a resilient seal 17 and a locking strip 20. As will be further discussed, the locking strip is inserted into the seal.

The arrangement for releasing the seal is discussed herein, along with other seals, involves, as illustrated in FIG. 4, the use of a handle 22 secured to the locking strip such that when the handle is pulled, the locking strip is removed from the seal and the exit panel is removed. The handle also conceals a wire rope lanyard 25 which is secured to the exit panel, thus, allowing the removal of the exit panel by pulling on the handle/lanyard.

The locking strip pull force is controlled by the specific shape of the key and the main key cavity as well as the materials of the seal and locking strip. Also, a low key pull force is obtained relatively easily utilizing the subject design by providing short retention tongues on both sides of the key cross-section profile. In prior art designs, the ability to provide a low pull force for the exit panel, once the locking strip is removed all around the perimeter of the exit panel, is diminished because the panel side wings do not move sufficiently away from the exit panel. As a result, the wings partially block the exit panel and impede the ability to easily remove the panel. However, the seal herein allows the panel side wings to rotate significantly further than prior art designs to permit removal of the panel with less interference from the panel side wings.

Figure 5:
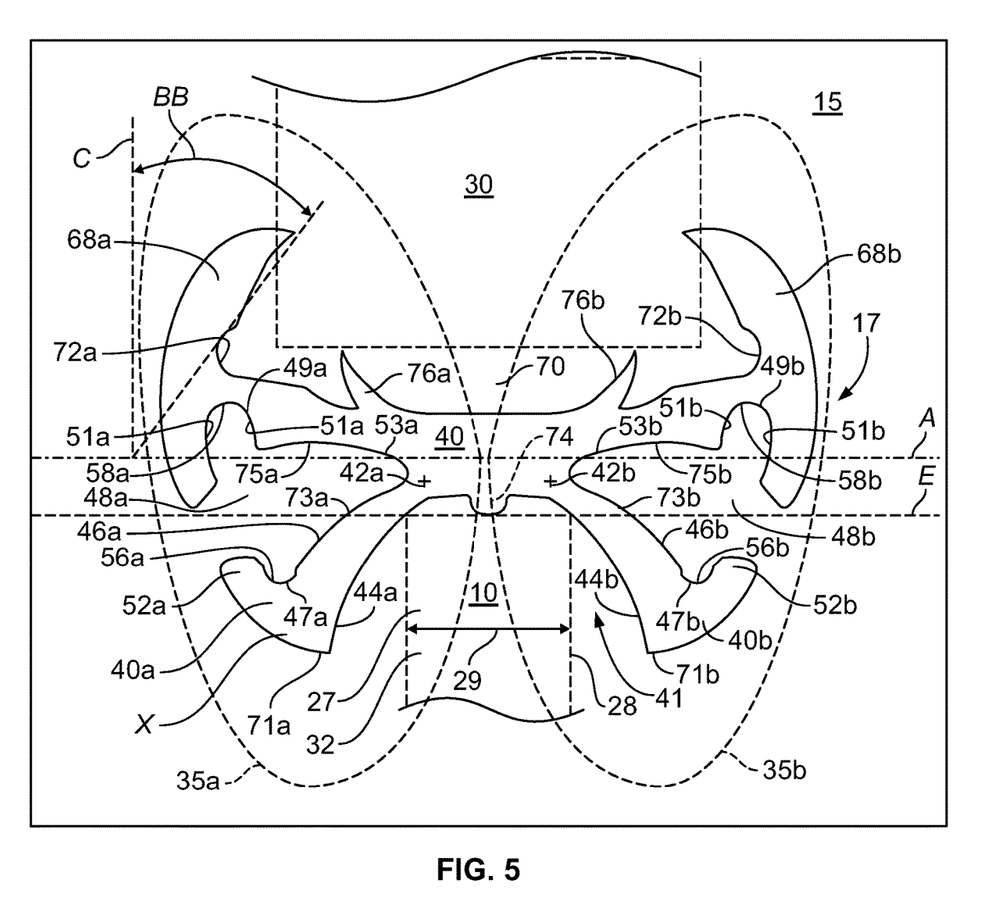
FIG. 5 is a cross-sectional view of a resilient seal.

Directing attention to FIG. 5, a seal assembly for removably securing an exit panel (illustrated in phantom) having opposing walls 27, 28 with a thickness 29 therebetween, to a host panel 30 also shown in phantom.

The seal has a first extension profile 35A and a second extension profile 35B extending from a core 40 defining an exit panel slot 41 therebetween. The core is disposed along a first axis A of the seal and extends across the width of the seal.

For purposes of discussion, components associated with the first extension profile will utilize a suffix "A", while those associated with a second extension profile will use a suffix "B". The first extension profile will be discussed with the understanding that the second extension profile features are identical and disposed symmetrically with respect to an axis at a right angle from the core first axis A and passing through the center of the core.

Directing attention to FIG. 5, the first extension profile has a first exit panel side wing 40A on one side of the slot. The first exit panel side wing is resiliently hinged about a pivot point 42A to the core in a relaxed position X away from the slot, as illustrated in FIG. 5. The core may be considered the central most portion of the seal that does not define any cavities, or slots of the seal. Instead the first extension profile and the second extension profile extend from the core and define the cavities and slots of the seal.

The first exit panel side wing has a panel side 44A that partially defines the slot and has an opposing cavity side 46A that partially defines a first key cavity 48A between the first exit panel side wing and a first host panel side wing 68A.

In particular, the first extension profile includes the first exit panel side wing resiliently hinged to the core, and a first host panel side wing. The first host panel side wing and first exit panel side wing define the first key cavity. Specifically, the first exit panel side wing includes a first arcuate surface 47A that defines a first retention tongue recess 56A that is configured to matingly receive a first arcuate surface 61A of a first retention tongue 54A of a first locking strip 50A. As used herein, the term matingly refers to a surface and recess having similar shapes that correspond with one another. In particular, in this example, the first arcuate surface is a partial circle, while the first locking strip includes a first retention tongue that also has a circular surface that corresponds with the partial circle of the first arcuate surface. While a mating coupling may include a surface that surrounds a tongue and would be considered a snug fit, a mating coupling may also include surfaces that do not surround the tongue, and only partially correspond to the tongue. In this manner, all snug fits may be considered a mating coupling, but not all mating couplings are snug fits. As used herein, a snug fit, fitting snuggly, or snuggly fit refer to a coupling where a surface of a first body is in close proximity, if not contacting the entire surface of a second body.

In addition, the first retention tongue recess 56A partially defines a profile of a first exit panel side wing tongue 52A. The first exit panel side wing tongue 52A is of size and shape to snuggly fit within a second retention tongue recess 58A of the first host panel side wing 68A. Specifically, when the exit panel 10 is to be removed, the first exit panel side wing 40A begins at a first biased position and is biased against the exit panel 10 with the first locking strip 50A within the first key cavity 48A. The first exit panel side wing 40A then moves to a second biased position after removal of first locking strip 50A as will be described in more detail in relation to FIGS. 8-9. In the second biased position, the first exit panel side wing 40A is matingly received by the first host panel side wing 68A such that the first exit panel side wing tongue 52A, first arcuate surface 47A, and side wing arcuate connection surface 73A of the first exit panel side wing 40A is matingly received by the second arcuate surface 49A and host panel arcuate connection surface 75A of the first host panel side wing 68A. In one example, the first exit panel side wing tongue 52A fits snuggly within the second retention tongue recess 58A of the first host panel side wing. In one example, the first exit panel side wing tongue 52A extends along elongated side surfaces 51A of the second arcuate surface 49A of the first host panel side wing 68A. Accordingly, the first exit panel side wing may pivot about the pivot point 42A such that a first exit panel side wing tip 71A clears a plane E (FIG. 9) made by the top surface of the exit panel 10 to facilitate removal of the exit panel 10. In this manner, the first exit panel side wing tip 71A is configured to engage the exit panel 10 in the first biased position, and to be above the plane E of the top surface of the exit panel 10 in the second biased position.

The second arcuate surface 49A that defines the second retention tongue recess of the first host panel side wing 68A also receives a second arcuate surface 65A of a second retention tongue 63A of the first locking strip. In one example, the second arcuate surface of the first host panel side wing has an oval shape, with the elongated side surfaces 51A. Specifically, the size and/or shape of the first arcuate surface of the first host panel side wing can be different than the size and/or shape of the second arcuate surface of the first host panel side wing. In one embodiment, the second arcuate surface is configured to receive the second retention tongue of the first locking strip such that the second retention tongue fits snuggly within the second retention tongue recess. In this manner, even slight lateral movement causes engagement of the second retention tongue with the second arcuate surface.

Meanwhile, the second extension profile has a second exit panel side wing 40B on another side of the slot. The second exit panel side wing is resiliently hinged about a pivot point 42B to the core in a relaxed position X away from the slot, as illustrated in FIG. 5.

The second exit panel side wing has a panel side 44B that partially defines the slot and has an opposing cavity side 46B that partially defines a second key cavity 48B between the second exit panel side wing and a second host panel side wing 68B.

In particular, the second extension profile includes the second exit panel side wing resiliently hinged to the core, and a second host panel side wing. The second host panel side wing and second exit panel side wing define the second key cavity. Specifically, the second exit panel side wing includes a first arcuate surface 47B that defines a first retention tongue recess 56B that is configured to matingly receive a first arcuate surface 61B of a first retention tongue 54B of a first locking strip 50B.

Meanwhile, the second host panel side wing includes a second arcuate surface 49B that defines a second retention tongue recess 58B for receiving a second arcuate surface 65B of a second retention tongue 63B of the second locking strip. In one example, the second arcuate surface of the second host panel side wing has an oval shape, with elongated side surfaces 51B. Specifically, the size and/or shape of the first arcuate surface of the second host panel side wing can be different than the size and/or shape of the second arcuate surface of the second host panel side wing. In one embodiment, the second arcuate surface is configured to receive the second retention tongue of the second locking strip such that the second retention tongue fits snuggly within the second retention tongue recess.

Disposed and extending from the first arcuate surface is wing side arcuate connection surface 73B, with a host panel arcuate connection surface 75B. The second exit panel side wing and second host panel side wing function in a similar manner as described above in relation to the one another.

Figure 6:
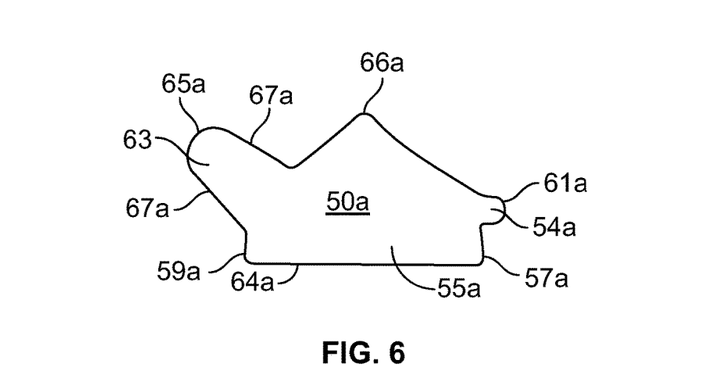
FIG. 6 is a cross-sectional view of a locking strip.
Figure 7:
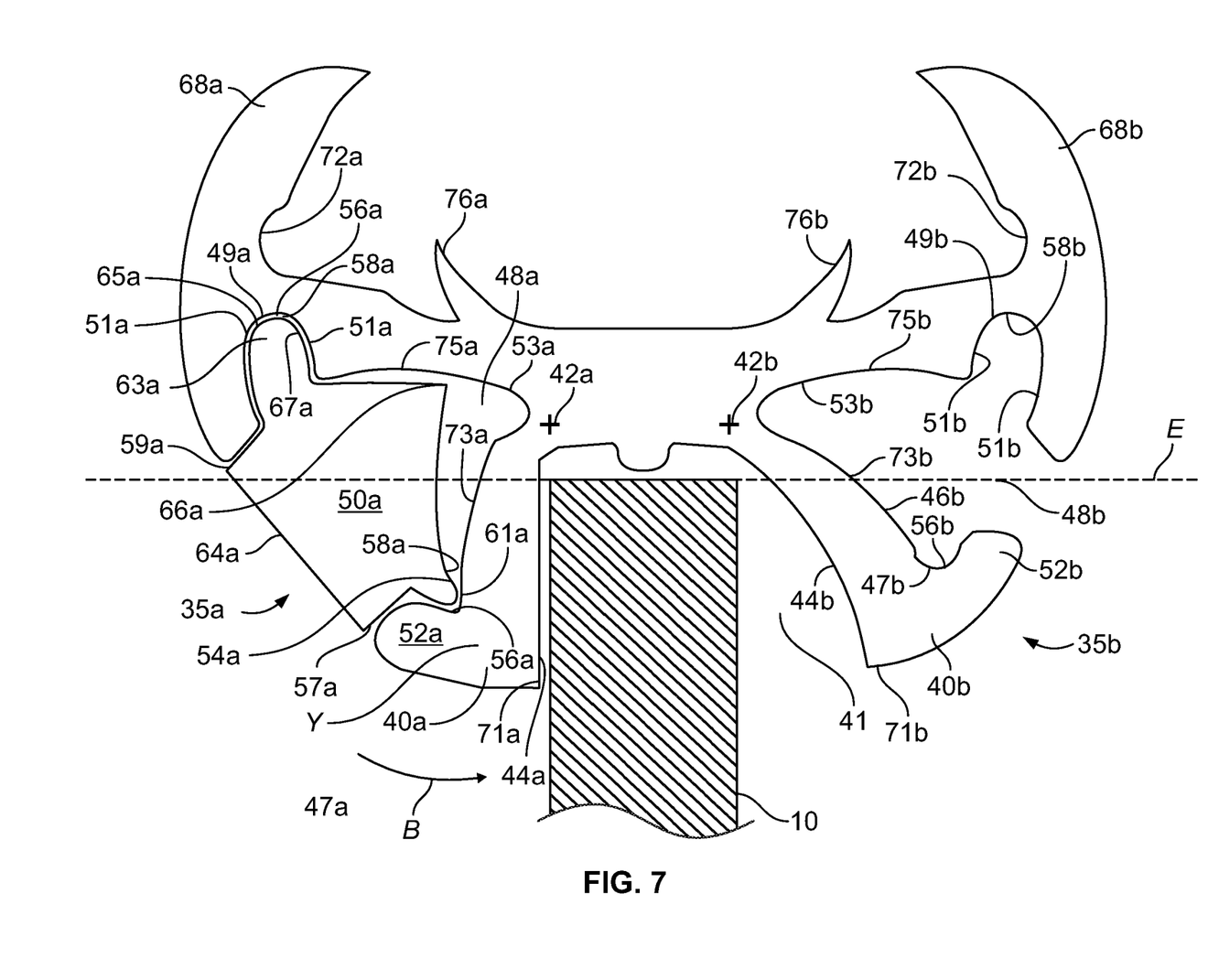
FIG. 7 is a cross-sectional view of the seal with the locking strip secured within the key cavity.
Figure 8:
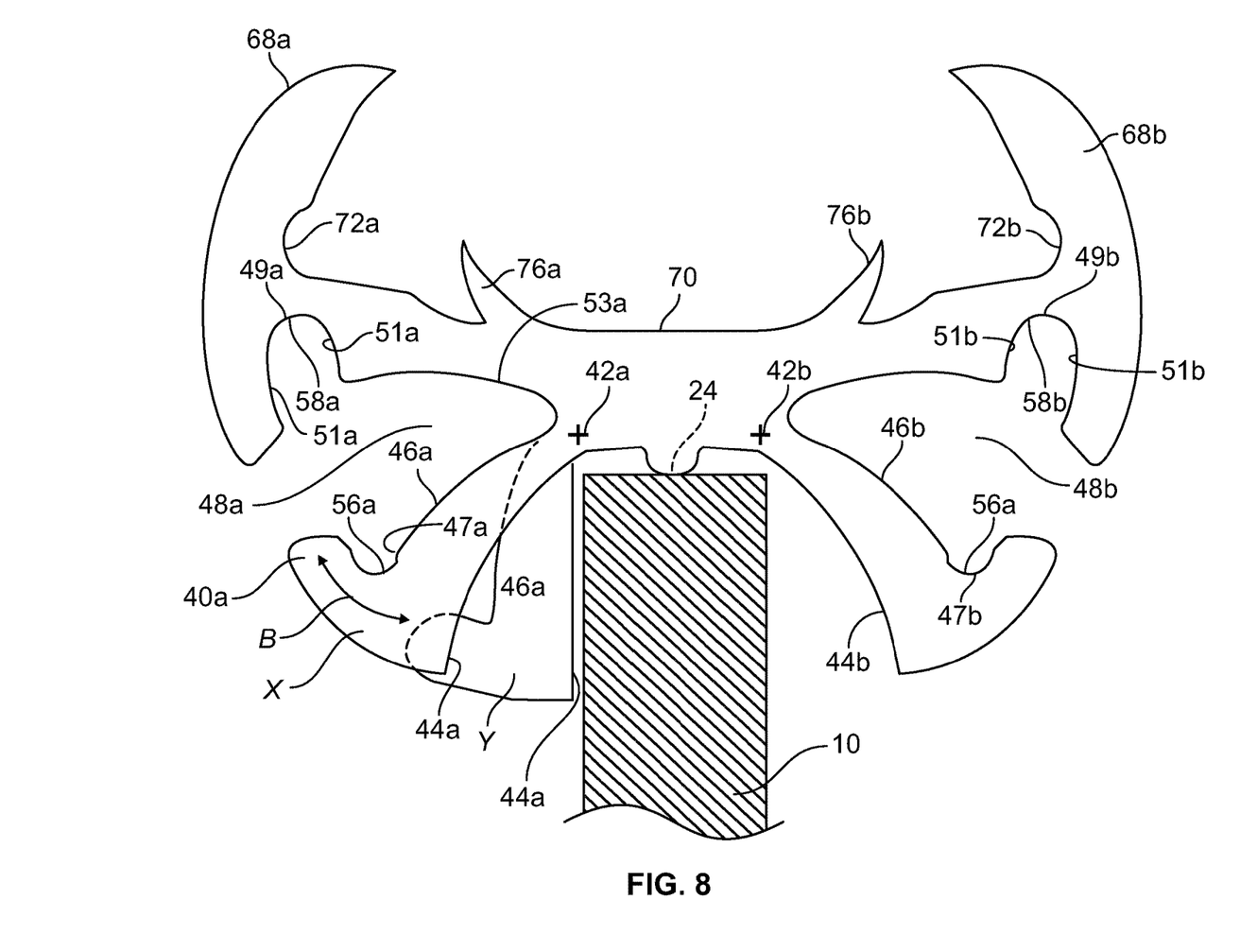
FIGS. 8 and 9 are cross-sectional views of the seal showing the range of motion of an exit panel side wing.

Directing attention to FIGS. 6-8, a first locking strip is shown in position within the first key cavity. It should be appreciated that with the first locking strip inserted within the first key cavity, the first exit panel side wing is displaced from a relaxed position X illustrated in FIG. 5 to a first biased position Y where it is urged against the exit panel. While only a first locking strip is illustrated in relation to the first key cavity, an identical second locking strip may be provided for the second key cavity. The second locking strip may function identically to the first locking strip.

Figure 9:
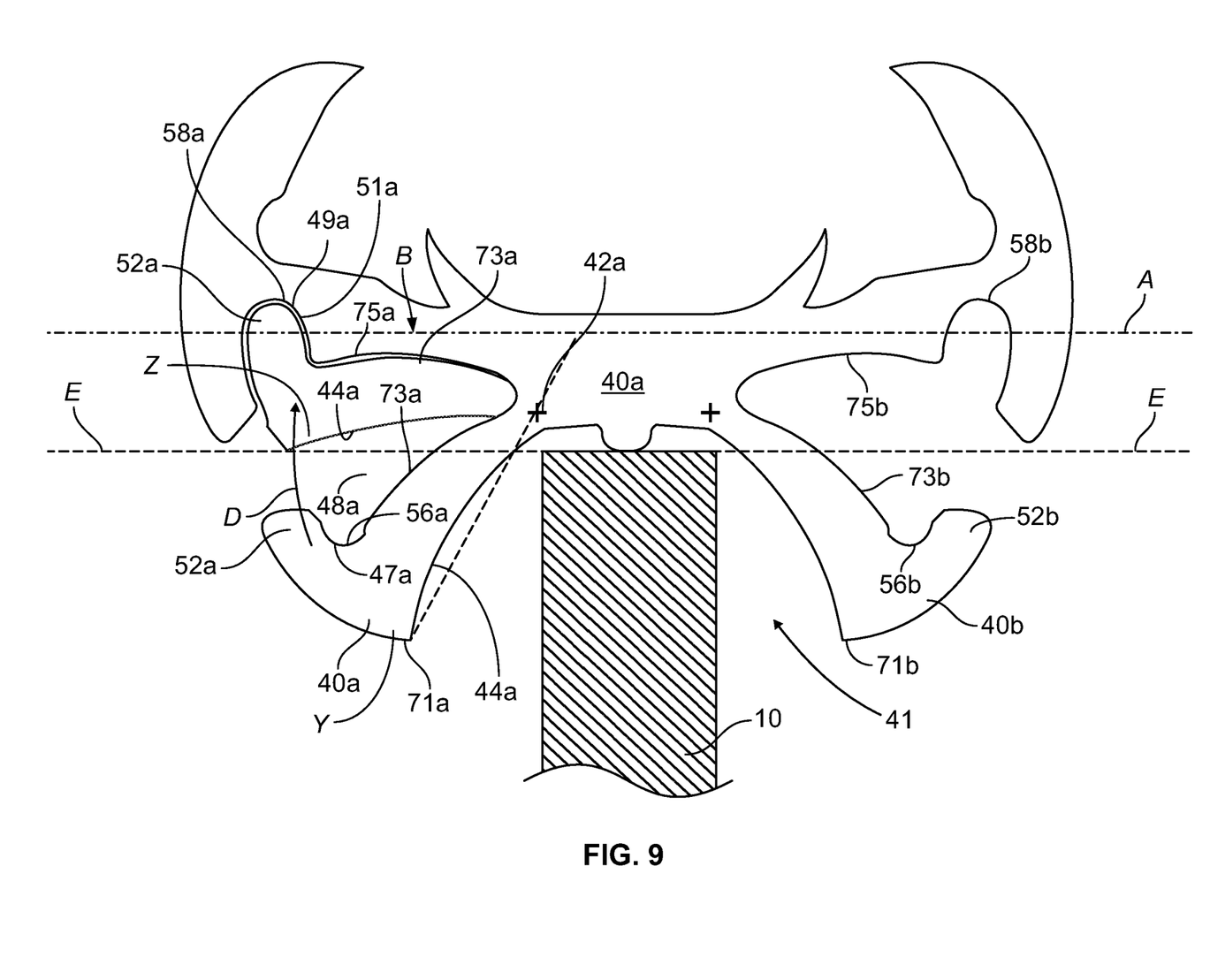

The first locking strip is removably coupled within the first key cavity to bias the first exit panel side wing against a panel disposed between the first extension profile and second extension profile. In one example, the first locking strip is asymmetrical. When used herein, asymmetrical indicates that when viewing an object (here the locking strip) along at least one of an X-plane, Y-plane, or Z-plane, no lines of symmetry exist in the plane. In this manner, FIG. 9 illustrates a first locking strip in a first plane, and no lines of symmetry exist in this plane, and therefore the first locking strip illustrated is asymmetrical.

The first locking strip may include a base 55A extending from a first end 57A to a second end 59A. The base may include a generally flat portion 64A that extends between the first end and second end. As illustrated in FIG. 7, when the first locking strip is positioned within the first key cavity, the flat portion is generally flush with an exterior surface of the seal. At the first end of the base, the first retention tongue extends and is configured to matingly fit within a first retention tongue recess of the first extension profile. In one example, the first retention tongue extends orthogonally from the base and may have a first arcuate surface that is configured to mate with the first retention tongue recess for movement in relation to the recess. In one example, the first arcuate surface has a partial circular shape.

The first locking strip may also include a second retention tongue extending from the second end of the base. In one example the second retention tongue may be configured to fit snuggly within the second retention recess of the second extension profile. In one example, the second retention tongue may include a second arcuate surface. The second arcuate surface in one embodiment may include elongated walls 67A. In one example, the diameter of the first arcuate surface of the first retention tongue is less than the diameter of the second arcuate surface of the second retention tongue. In this manner, the second arcuate surface of the second retention tongue is both larger and a different shape than the first arcuate surface of the first retention tongue. In one embodiment, the second retention tongue extends transverse to the base. As used herein, the term transverse means not parallel or orthogonal. Specifically, the second retention tongue extends at an angle to the base, again differing from how the first retention tongue extends from the base.

The first locking strip may also include a key wedge 66A that is disposed between the first retention tongue and the second retention tongue. The key wedge at a first end extends from the first retention tongue and at a second end extends from the second retention tongue, and the key wedge is configured not to engage the first extension profile when the first locking strip is removably coupled within the first key cavity.

In particular, the first locking strip in FIG. 7 is positioned within the first key cavity of the first extension profile such that the first exit panel side wing is resiliently displaced about the pivot point and the first exit panel side wing extends against the edge of the exit panel within the slot. When both the first extension profile and the second extension profile assume this configuration, then the exit panel is securely retained within slot of the seal.

Directing attention to FIGS. 8 and 9, when the first locking strip is removed from the first key cavity, the first exit panel side wing returns from the first biased position Y to the relaxed position X with the exit panel free to be removed from the slot. In particular, from the first biased position Y, with the first locking strip removed from the first key cavity of the first extension profile, the first exit panel side wing is returned to the relaxed position X away from the slot such that the exit panel may be removed from the slot. As illustrated in FIG. 9, in the relaxed position X the panel side of the first exit panel side wing forms an angle B with a maximum value substantially equal to 60 degrees with respect to axis A to allow for the easy removal of the exit panel.

However, directing attention again to FIG. 9, it should be appreciated that upon lateral removal of the exit panel, the exit panel may further displace the first exit panel side wing to a second biased position Z. Again, directing attention to FIG. 9, the first exit panel side wing has a first exit panel side wing tip 71A that moves along an arc of the hinge defined by the pivot point. The first exit panel side wing 40A is matingly received by the first host panel side wing 68A such that the first exit panel side wing tongue 52A, first arcuate surface 47A, and side wing arcuate connection surface 73A of the first exit panel side wing 40A is matingly received by the second arcuate surface 49A and host panel arcuate connection surface 75A of the first host panel side wing 68A in the second biased position Z. The biased position Z results in the tip 70A of first exit panel side wing 40A to be even with, or above the plane E of the top surface of the exit panel 10. Specifically, in one example, the tip 70A of the first exit panel side wing is configured to clear the plane E of the top surface of the exit panel 10 to provide clear path for the exit panel to be removed. In this manner, extraction of the exit panel 10 is facilitated by allowing a reduction in the required extraction pull force upon removal of the exit panel 10.

As illustrated in FIG. 5, the first host panel side wing includes a stress relief recess 72A at its junction with the core wherein the stress relief recess may be semicircular. Furthermore, the seal adjacent to the exit panel slot may include a protrusion 74 extending into the slot. This protrusion may be semicircular and is intended to provide a lower friction surface between the seal and the edge of the exit panel, thus, lowering the panel extraction force.

Again, returning to FIG. 5, at least one lip 76A may extend into the host panel slot 70 of the host panel to contact the host panel to provide a waterproof seal. The host panel slot may be configured to receive a host panel that has a width that is substantially wider than the exit panel. In one example, the host panel is at least 25% wider than the exit panel.

As illustrated in FIG. 5, the second host panel side wing 68B includes a stress relief recess 72B at its junction with the core wherein the stress relief recess may be semicircular. At least one lip 76B may extend into the host panel slot of the host panel to contact the host panel to provide a waterproof seal.

It should be noted from an inspection of FIG. 5 that the seal may be symmetric about an axis at a right angle from the core first axis A and passing through the center of the core. The seal may be made of resilient material such as EPDM, neoprene, or silicone rubber while the preferred material is neoprene. Furthermore, the seal should preferably have a hardness of about 70 Shore. The first locking strip may be of a similar material and have similar properties.

While so far discussed are both a first extension profile and a second extension profile having key cavities, it is entirely possible for one of these key cavities to be eliminated such that that region of one of the exit panel side wing/key cavity combinations is essentially solid. Under these circumstances, only a single exit panel side wing would be utilized to release the exit panel and the exit panel would then only be able to be removed from a single direction.

Finally, the subject invention may be directed to a method for releasing an exit panel from a host panel using a seal as described herein wherein the first locking strip is secured within the first key cavity wherein the method comprises the steps of removing the first locking strip from the first key cavity such that the first exit panel side wing moves to the relaxed position and, thereafter, removing the exit panel from the seal such that the exit panel displaces the first exit panel side wing up to a point where the first retention tongue engages the first retention tongue recess.

In one or more embodiments, a releasable seal assembly is provided that may include a first extension profile and a second extension profile extending from a core. The first extension profile may include a first exit panel side wing resiliently hinged to the core and configured to move from a first biased position to a second biased position, and a first host panel side wing extending from the core. The first exit panel side wing and the first host panel side wing may define a first key cavity, and the first exit panel side wing has a first arcuate surface that may define a first retention tongue recess of the first key cavity. Additionally, the first host panel side wing has a second arcuate surface that defines a second retention tongue recess of the first key cavity. The first exit panel side wing may include a first exit panel side wing tongue configured to be received within the second retention tongue recess when the first exit panel side wing is in the second biased position.

Optionally, the first exit panel side wing tongue may be configured to fit snuggly within the second retention tongue recess when the first exit panel side wing is in the second biased position. In one aspect, the first exit panel side wing may include a first exit panel side wing tip that is configured to engage an exit panel in the first biased position, and to be above a plane of a top surface of the exit panel in the second biased position. In another aspect, the first host panel side wing may include a host panel side wing arcuate connection surface that is configured to matingly receive an exit panel side wing arcuate connection surface of the first exit panel side wing when the first exit panel side wing is in the second biased position. In one example, the first key cavity may be configured to receive a first locking strip that is configured to engage the first host panel side wing and the first exit panel side wing to place the first exit panel side wing in the first biased position. Optionally, the first locking strip may be asymmetrical and removably coupled within the first key cavity.

In one or more embodiment, a releasable seal assembly is provided that may include a first extension profile and a second extension profile extending from a core. The first extension profile may include a first exit panel side wing resiliently hinged to the core, and at least partially define a first key cavity. The second extension profile may include a second exit panel side wing resiliently hinged to the core, and at least partially define a second key cavity. The releasable seal assembly may also include a first locking strip that may be asymmetrical and removably coupled within the first key cavity. The first locking strip may be configured to bias the first exit panel side wing against a panel disposed between the first exit panel side wing and the second exit panel side wing. The releasable seal assembly may also include a second locking strip that may similarly be asymmetrical and removably coupled within the second key cavity. The second locking strip may be configured to bias the second exit panel side wing against the panel disposed between the first exit panel side wing and the second exit panel side wing.

Optionally, the first locking strip includes a base extending from a first end to a second end, a first retention tongue extending from the first end of the base and configured to matingly fit within a first retention tongue recess of the first extension profile, a second retention tongue extending from the second end of the base and configured to fit snuggly within a second retention tongue recess of the second extension profile, and a key wedge disposed between the first retention tongue and second retention tongue. In one aspect, the first retention tongue may extend orthogonally from the base at the first end and may include a first arcuate surface. In another aspect, the second retention tongue may extend transverse from the base at the second end and may include a second arcuate surface. In one example, the first retention tongue may include a first arcuate surface, and the second retention tongue may include a second arcuate surface. The diameter of the first arcuate surface may be less than the diameter of the second arcuate surface. In another example, the key wedge at the first end may extend from the first retention tongue and at the second end may extend from the second retention tongue. The key wedge may be configured not to engage the first extension profile when the first locking strip is removably coupled within the first key cavity.

Optionally, the first extension may include a first host panel side wing. The first host panel side wing and first exit panel side wing may define the first key cavity. In one aspect, the first exit panel side wing may have a first arcuate surface that defines a first retention tongue recess of the first key cavity. The first host panel side wing may have a second arcuate surface that may define a second retention tongue recess of the first key cavity. The first exit panel side wing may also include a first exit panel side wing tongue configured to be received within the second retention tongue recess. In another aspect, the first exit panel side wing tongue may be configured to fit snuggly within the second retention tongue recess.

In one or more embodiments, a releasable seal assembly is provided that may include a first extension profile and a second extension profile extending from a core. The first extension profile may include a first exit panel side wing resiliently hinged to the core, and at least partially defining a first key cavity. The second extension profile may include a second exit panel side wing resiliently hinged to the core, and at least partially defining a second key cavity. The releasable seal assembly may also include a first locking strip that may be removably coupled within the first key cavity. The first locking strip may be configured to bias the first exit panel side wing against a panel disposed between the first extension profile and the second extension profile. The first locking strip may also have a first retention tongue with a first arcuate surface configured to matingly fit within a first retention tongue recess of the first extension profile. Additionally, the first locking strip may have a second retention tongue with a second arcuate surface that may be a different shape than the first arcuate surface. The first locking strip may also be configured to receive a second retention tongue recess of the second extension profile.

Optionally, the first extension profile may include a first host panel side wing that may include a host panel arcuate connection surface configured to matingly receive an exit panel side wing arcuate connection surface of the first exit panel side wing. In one aspect, the first exit panel side wing may have a first arcuate surface that defines a first retention tongue recess of the first key cavity. The first host panel side wing may have a second arcuate surface that defines a second retention tongue recess of the first key cavity. The first exit panel side wing may include a first exit panel side wing tongue configured to be received within the second retention tongue recess. In one aspect, the first exit panel side wing tongue may be configured to fit snuggly within the second retention tongue recess. In another aspect the first locking strip may be asymmetrical.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A releasable seal assembly comprising:
   a first extension profile and a second extension profile extending from a core, the first extension profile comprising:
   a first exit panel side wing resiliently hinged to the core and configured to move from a first biased position to a second biased position;
   a first host panel side wing extending from the core;
   the first exit panel side wing and the first host panel side wing defining a first key cavity, the first exit panel side wing having a first arcuate surface that defines a first retention tongue recess of the first key cavity, the first host panel side wing having a second arcuate surface that defines a second retention tongue recess of the first key cavity; and
   the first exit panel side wing including a first exit panel side wing tongue configured to be received within the second retention tongue recess when the first exit panel side wing is in the second biased position.

2. The releasable seal assembly of claim 1, wherein the first exit panel side wing tongue is configured to fit snuggly within the second retention tongue recess when the first exit panel side wing is in the second biased position.

3. The releasable seal assembly of claim 1, wherein the first exit panel side wing includes a first exit panel side wing tip that is configured to engage an exit panel in the first biased position, and to be above a plane of a top surface of the exit panel in the second biased position.

4. The releasable seal assembly of claim 1, wherein the first host panel side wing includes a host panel side wing arcuate connection surface that is configured to matingly receive an exit panel side wing arcuate connection surface of the first exit panel side wing when the first exit panel side wing is in the second biased position.

5. The releaseable seal assembly of claim 1, wherein the first key cavity is configured to receive a first locking strip that is configured to engage the first host panel side wing and the first exit panel side wing to place the first exit panel side wing in the first biased position.

6. The releasable seal assembly of claim 5, wherein the first locking strip is asymmetrical and removably coupled within the first key cavity.

7. A releasable seal assembly comprising:
   a first extension profile and a second extension profile extending from a core, the first extension profile including a first exit panel side wing resiliently hinged to the core, and at least partially defining a first key cavity, the second extension profile including a second exit panel side wing resiliently hinged to the core, and at least partially defining a second key cavity;
   a first locking strip that is asymmetrical and removably coupled within the first key cavity, the first locking strip configured to bias the first exit panel side wing against a panel disposed between the first exit panel side wing and the second exit panel side wing; and
   a second locking strip that is asymmetrical and removably coupled within the second key cavity, the second locking strip configured to bias the second exit panel side wing against the panel disposed between the first exit panel side wing and the second exit panel side wing;
   wherein the first extension profile includes a first host panel side wing, and wherein the first host panel side wing and first exit panel side wing define the first key cavity;
   wherein the first exit panel side wing has a first arcuate surface that defines a first retention tongue recess of the first key cavity, the first host panel side wing having a second arcuate surface that defines a second retention tongue recess of the first key cavity; and
   the first exit panel side wing including a first exit panel side wing tongue configured to be received within the second retention tongue recess.

8. The releasable seal assembly of claim 7, wherein the first locking strip comprises:
   a base extending from a first end to a second end;
   a first retention tongue extending from the first end of the base and configured to matingly fit within the first retention tongue recess of the first extension profile;
   a second retention tongue extending from the second end of the base and configured to fit snuggly within the second retention tongue recess of the first extension profile; and
   a key wedge disposed between the first retention tongue and second retention tongue.

9. The releasable seal assembly of claim 8, wherein the first retention tongue extends orthogonally from the base at the first end and includes a first arcuate surface.

10. The releasable seal assembly of claim 8, wherein the second retention tongue extends transverse from the base at the second end and includes a second arcuate surface.

11. The releasable seal assembly of claim 8, wherein the first retention tongue includes a first arcuate surface, and the second retention tongue includes a second arcuate surface, and a diameter of the first arcuate surface is less than the diameter of the second arcuate surface.

12. The releasable seal assembly of claim 8, wherein the key wedge at the first end extends from the first retention tongue and at the second end extends from the second retention tongue, and the key wedge is configured not to engage the first extension profile when the first locking strip is removably coupled within the first key cavity.

13. The releasable seal assembly of claim 7, wherein the first exit panel side wing tongue is configured to fit snuggly within the second retention tongue recess.

14. A releasable seal assembly comprising:
   a first extension profile and a second extension profile extending from a core, the first extension profile including a first exit panel side wing resiliently hinged to the core, and at least partially defining a first key cavity, the second extension profile including a second exit panel side wing resiliently hinged to the core, and at least partially defining a second key cavity; and
   a first locking strip that is removably coupled within the first key cavity, the first locking strip configured to bias the first exit panel side wing against a panel disposed between the first extension profile and the second extension profile, the first locking strip having a first retention tongue with a first arcuate surface configured to matingly fit within a first retention tongue recess of the first extension profile, the first locking strip having a second retention tongue with a second arcuate surface that is a different shape than the first arcuate surface, and the first locking strip configured to receive a second retention tongue recess of the first extension profile; and
   wherein the first extension profile includes a first host panel side wing including a host panel arcuate connection surface configured to matingly receive an exit panel side wing arcuate connection surface of the first exit panel side wing.

15. The releasable seal assembly of claim 14, wherein the first exit panel side wing has a first arcuate surface that defines a first retention tongue recess of the first key cavity, the first host panel side wing having a second arcuate surface that defines a second retention tongue recess of the first key cavity; and
   the first exit panel side wing including a first exit panel side wing tongue configured to be received within the second retention tongue recess.

16. The releasable seal assembly of claim 15, wherein the first exit panel side wing tongue is configured to fit snuggly within the second retention tongue recess.

17. The releasable seal assembly of claim 14, wherein the first locking strip is asymmetrical.

* * * * *